United States Patent Office 3,585,117
Patented June 15, 1971

3,585,117
CHLORINATION OF HOMOPOLYMERS OR COPOLYMERS OF VINYL CHLORIDE AND/OR ETHYLENE IN SUSPENSION IN THE PRESENCE OF DIMETHYLSULFOXIDE
Wilhelm Gresser, Troisdorf, and Gunther Meyer, Sieglar, Germany, assignors to Dynamit Nobel Aktiengesellschaft, Troisdorf, Germany
No Drawing. Filed July 24, 1968, Ser. No. 747,131
Claims priority, application Germany, Aug. 25, 1967,
D 53,929
Int. Cl. B01j 1/00; C08f 1/00
U.S. Cl. 204—159.18                                    10 Claims

ABSTRACT OF THE DISCLOSURE

Process for chlorinating homopolymers or copolymers of vinylchloride and/or ethylene in aqueous suspension, preferably containing hydrochloric acid or sulfuric acid, at a temperature of 0 to 100° C., under action of ultraviolet light, characterized in that dimethyl sulfoxide, in an amount of from 0.03 to 20% referred to the amount of polymer, is used as the swelling agent.

---

This invention relates to a method of chlorinating homopolymers or copolymers of vinylchloride and/or ethylene in suspension. It is particularly concerned with the method of chlorinating homopolymers or copolymers of vinylchloride and/or ethylene in suspension under the action of ultra-violet light and utilizing dimethylsulfoxide as a swelling agent.

It is in the prior art to prepare post-chlorinated vinyl polymers by the chlorination of polyvinylchloride (PVC) or copolymers thereof, to produce materials characterized by better thermal stability of shape than the starting materials. Processes have been described in German Green Pats. 1,138,547 and 1,210,561, according to which PVC is chlorinated in suspension by passing chlorine through the suspension while subjecting the reaction mixture to the action of ultura-violet light. In order to achieve uniformly chlorinated products, however, it is necessary to add to the reaction mixture considerable amounts of chlorinated hydrocarbons as swelling agents, chloroform being preferred for this purpose.

Furthermore, processes in which chlorinated hydrocarbons are used as solvents for the polymer are known. In such processes the chlorination product has to be recovered by precipitation. The relatively large amounts of chlorinated hydrocarbons that have been used have to be recovered, this in an economically unfavorable manner, in which considerable losses occur, particularly due to the solvents retention in the chlorinated PVC.

In the known processes where the chlorniation is conducted in aqueous or hydrochloric acid suspension under the use of chlorinated hydrocarbons, a greatly diminishing and fluctuating rate of chlorine absorption is often observed during the chlorination, and therewith a widely fluctuating rate of conversion. These disadvantages are to be attributed to an insufficient swelling action on the part of the chlorinated hydrocarbons, resulting in poor reproducibility as regards the course of the reaction and the properties of the resultant product.

It is therefore an object of the present invention to provide an improved process for the chlorination of homopolymers or copolymers of vinylchloride and/or ethylene.

Another object is to provide an economical and uniform, i.e., reproducible process for the chlorination of homopolymers or copolymers of vinylchloride and/or ethylene.

Still another object is to provide a process involving a minimum of process steps, which can be carried out batchwise or continuously.

More particularly, an object of the invention is to provide a novel polyvinyl chlorination process of the above type.

Other objects and advantages will become apparent from the following description and examples.

In accordance with the invention, it has now been found that homopolymers and copolymers of vinyl chloride and/or ethylene can be chlorinated in an economically advantageous manner by contacting the polymeric vinylchloride with chlorine in aqueous suspension containing, if desired, hydrochloric acid or sulfuric acid, at a temperature of from 0 to 100° C. and preferably of from 30 to 60° C. under the action of shortwave length light, and using dimethyl sulfoxide as the swelling agent, the latter in an amount of 0.03 to 20% and preferably 0.07 to 3% referred to the amount of polymer used.

Most surprisingly, the dimethyl sulfoxide results in a good opening of the polymer granules and therewith a uniform chlorination, even through it, itself, is unstable to chlorine.

It is also possible, in accordance with the invention, to use chlorinated hydrocarbons such as chloroform, carbon tetrachloride, perchlorethylene, trichlorethylene and the like, as additional swelling agents.

The process is preferably carried out in the presence of peroxy compounds in quantities of 0.1 to 3%, preferably 0.01 to 0.5% referred to the amount of the polymer. Illustrative of peroxy compounds which are suitable for use in this connection are inorganic, organic compounds containing an O—O group, such as hydrogen peroxide, persulfuric acid and its salts, peroxydicarbonates, alkylhydroperoxides such as tert. butyl hydroperoxide and cumene hydroperoxide: dialkylperoxides such as diethyl peroxide and methyl tetrahydronaphthyl peroxide: diacyl peroxides such as dilauroyl peroxide, dichlorbenzoyl peroxide and dibenzoyl peroxide: asymmetrical peroxides such as acetyl-cyclohexanesulfonyl peroxide and peroxy acids such as peracetic acid, etc. In the above compounds the alkyl or acetyl radical, can be, for example, an aliphatic, cycloaliphatic, aromatic, araliphatic or heterocyclic radical, which may be substituted. The use of the peroxy compounds accelerates the chlorination reaction considerably.

The use of dimethylsulfoxide (DMSO) as swelling agent, even in the small amounts as above set out, brings about a complete opening up of the polymer granules. The reaction starts immediately following turning on of the light source and leads to a large increase in the chlorine absorption, which then remains at a high rate throughout the reaction period, with only a very slight fall-off. The chlorine is introduced at the rate at which it is consumed in the reaction, so that only little or no chlorine is lost in the exhaust gas. A special advantage of the process of the invention lies in the excellent reproducibility of the rate at which the chlorine is absorbed and of the properties of the resultant products, such as bulk weight, degree of chlorination and Vicat number. The addition of the dimethylsulfoxide can take place in part during the reaction. The reaction proceeds in such a manner that, by the completion of the reaction, no undecomposed DMSO remains. This renders unnecessary the removal or recovery of the swelling agent in the final purification of the chlorinated product. During the chlorination, the DMSO is decomposed into aqueous or low-boiling cleavage products such as methyl, chloride, thionyl or sulfonyl chloride, and the decomposition products thereof, $SO_2$ and HCl, some of which escape along with the exhaust gas.

The irradiation can be in the form of visible light containing short-wavelength components, or ultraviolet light, such as the light produced, for example, by incandescent lamps, fluorescent tubes, arc lights, mercury vapor lamps, etc.

Polyvinyl chloride and/or polyethylene, or copolymers of vinyl chloride and/or ethylene can be used as starting materials. There are no limitations as regards, for example, the manufacturing process, molecular weight, grain size, grain size makeup and porosity of the starting materials. It is possible to use atactical or substantially sterically arranged (so-called "tactical") polyvinyl chloride or copolymers thereof. When high-pressure or low-pressure polyethylene or its copolymers and/or mixtures thereof with polyvinyl chloride or vinyl chloride copolymers are used as starting materials, it is advantageous to carry out a preliminary steeping of the polyethylene (for from about 30 min. to about 10 hours) or of its copolymers in dimethyl sulfoxide. Mixtures of PVC and polyethylene or copolymers thereof are used preferably with a content of 2 to 45% polyethylene or polyethylene copolymers. The term copolymers is intended to include grafted polymers of, for example, vinyl chloride and ethylene or vinyl acetate and ethylene. The K values of the PVC (according to DIN 53726) should amount to between 50 and 90. The following are suitable, for example, as comonomers of the copolymers of vinyl chloride and/or ethylene: vinyl acetate, vinyl ether, vinyl propionate, vinylcetyl ether, vinylidene chloride, acrylic and methacrylic esters, acrylonitrile, trichlorethylene, maleic and fumaric esters, propylene, butylene and isobutylene, etc. The rapid and complete swelling of the polymers by the DMSO in the process of the invention can be advantageously exploited to make the process a continuous one in which the addition of the starting materials and of the DMSO and the removal of the chlorination products can be performed continuously or batch-wise during the chlorination reaction.

The purification of the chlorination products can be carried out by the conventional methods of, for instance, filtration, centrifugation, neutralization, if necessary, and washing, steam or vacuum distillation, etc., followed by drying, including fluidized bed air drying. The purification is made easier in comparison to known processes, however, as no recovery of swelling agents or solvents are required. The pure white products obtained are free of hydrochloric acid and have a high bulk weight.

The bulk weights of the PVC starting product amount to about 450 g./l., and those of the chlorinated PVC amount to from 500 to 550 g./l., and hence are higher than the corresponding products obtained by the suspension chlorination processes of the prior art. The chlorine content of the reaction product can amount to approximately 58 to 72% by weight for chlorinated PVC, and correspondingly less for chlorinated copolymers, polyethylene and mixtures of polymers.

The products obtained have a high thermal stability. When subjected to the oven test, strips cut from roller hides and having a thickness of about 0.5 mm. were maintained at 185° C., the thermostability, i.e., the time elapsed until the commencement of a dark discoloration, amounted to about 100 to 120 minutes. The Vicat values (temperatures) increase as the chlorine content of the products increases and run between 115 and 135° C.

The details of operation and the best method of carrying out the process will be illustrated by the following examples:

In the examples, the reaction times amounted to from 2 to 10 hours. In general, shorter chlorination times are required for finely granulated polymers than are required for coarsely granulated polymers. When suspension or emulsion PVC is used in an average grain size of 75 microns, agglomerate-free chlorination products are obtained, the grain size of which to the extent of about 60% is between 75 and 100 microns. The chlorine contents of the products are given in percent by weight.

EXAMPLE 1

Starting materials: Kg.
    PVC, K value=68 _____ 130
    Desalted water _____ 470
    Dimethylsulfoxide _____ 3
Reaction temperature: 50–52° C.

The starting materials were introduced into an enameled 800-liter reaction vessel equipped with a stirring mechanism and the mixture brought to the reaction temperature. The stirring speed amounted to about 100 to 120 r.p.m. The radiation source was not started up until after the oxygen in the air had been substantially completely displaced by the introduction of 5 kg. of gaseous chlorine. Thereafter the mercury vapor lamp (2 kw.) was turned on. The desired degree of chlorination was obtained by metering in 70 kg. of chlorine. After the reaction had been completed, a vacuum distillation was carried out in order to remove excess chlorine and other impurities. The remaining aqueous, HCl-containing suspension of chlorinated PVC was dewatered by centrifugation. Following drying with hot air in a fluidized bed, there was obtained a pure-white product that was free of hydrochloric acid. Reaction time: 10 hours. Chlorine content= 67–68%, Vicat temperature=122° C., bulk weight= 510 g./l.

EXAMPLE 2

Starting materials: Kg.
    PVC, K value=68 _____ 200
    Desalted water _____ 470
    DMSO _____ 3
Reaction temperature: 50–52° C.

The components were introduced into the reaction vessel and the vessel evacuated during the heating up to reaction temperature. Chlorine was then introduced until pressure equilibrium was established, and the light source then turned on. Another 105 kg. of chlorine were required for the reaction.

Purifiication was carried out in the manner described in Example 1. Reaction time: 10 hours.

Chlorine content=67–68%, Vicat temperature=122° C., bulk weight=515 grams per liter.

EXAMPLE 3

Starting materials: Kg.
    PVC, K value=68 _____ 130
    Desalted water _____ 470
    DMSO _____ 3
Reaction temperature: 50–52° C.

The procedure differed from that described in Examples 1 and 2 in that ⅓ of the stated quantity of DMSO was added continuously during the chlorination. The reaction mixture which was obtained was purified as set out in Examples 1 and 2. Reaction time: 10 hours. Chlorine content=67%, Vicat temperature=122° C., bulk weight= 525 g./l.

EXAMPLE 4

Starting materials: Kg.
    PVC, K value=60 _____ 105
    Desalted water _____ 350
    DMSO _____ 3
Reaction temperature: 50–52° C.

The reaction components were introduced into the reaction vessel and chlorinated according to the procedure described in Example 2.

EXAMPLE 5

Starting materials: Kg.
- PVC, K value=68 _____ 130
- Water _____ 470
- DMSO _____ 2

A procedure analogous to that described in Example 2, was followed, excepting that 103.6 kg. of Cl were used. Reaction time: 18 hours, chlorine content=69.5%, Vicat temperature=132° C., bulk weight=549 g./l.

EXAMPLE 6

The procedure followed was the same as set out in Example 5, excepting that 60 kg. of chlorine were used. Reaction time: 4 hours 30 min., chlorine content=65.2%, Vicat temperature=114° C., bulk weight=532 g./l.

EXAMPLE 7

Starting materials: G.
- Tactical PVC, K value=66 _____ 700
- Desalted water _____ 2800
- DMSO _____ 21

The PVC was dispersed in the stated quantity of water. Following the addition of the DMSO, the air (oxygen) in the reaction vessel was scavenged by introduction of 100 g. $Cl_2$. The light source was turned on and 320 g. of $Cl_2$ were then introduced. Reaction temperature=62° C., reaction time=50 min., chlorine content=63.6%, Vicat temperature=119° C., bulk weight=368 g./l.

EXAMPLE 8

Starting materials: G.
- PVC, K value=68 _____ 700
- Desalted water _____ 2800
- DMSO _____ 21
- Lauroyl peroxide _____ 2.1

The procedure followed was the same as set out in Example 7. After 395 g. $Cl_2$ had been introduced a chlorination product was obtained having the following characteristics: Reaction temperature=63° C., reaction time=1 hour 45 min., chlorine content=65.2%, Vicat temperature=115° C., bulk weight=500 g./l.

EXAMPLE 9

Starting materials: G.
- PVC, K value=68 _____ 700
- Desalted water _____ 2750
- DMSO _____ 21
- $K_2S_2O_8$ _____ 3.5

The chlorination was conducted as described in Example 7, with the introduction of 400 g. of chlorine gas. Reaction temperature=56° C., reaction time=1 hour, 40 min., chlorine content=66.0%, Vicat temperature=115° C., bulkweight=500 g./l.

EXAMPLE 10

Starting materials: G.
- PVC, K value=68 _____ 700
- High-pressure polyethylene powder, ($d$=0.915 g./cm.$^3$), melting index=22 _____ 35
- Desalted water _____ 2800
- DMSO _____ 21

The polyethylene powder was mixed with the DMSO and, after standing with the PVC for half an hour, the mixture was dispersed in water. The chlorination was carried out according to the procedure of Example 7, with the introduction of 410 g. $Cl_2$. Reaction temperature=47° C., reaction time=2 hours, 30 min., chlorine content=64.9%, Vicat temperature=108° C., bulk weight=510 g./l.

EXAMPLE 11

Starting materials: G.
- PVC, K value=68 _____ 700
- Low-pressure polyethylene powder ($d$=0.950 g./cm.$^3$), melting index=1.8 _____ 35
- Desalted water _____ 2800
- DMSO _____ 21

The procedure followed was the same as described in Example 10. 500 g. of chlorine gas were used for the reaction. Reaction temperature +58° C., reaction time=2 hours, 10 min., chlorine content=66.1%, Vicat temperature=115° C., bulk weight=500 g./l.

EXAMPLE 12

Starting materials: G.
- High-pressure polyethylene powder ($d$=0.915 g./cm.$^3$), melting index=22 _____ 350
- Desalted water _____ 3100
- DMSO _____ 20

The polyethylene powder was mixed with DMSO and the mixture then dispersed in water. Chlorination was carried out as described in Example 7 using 400 g. of chlorine gas. Reaction temperature=56° C., reaction time=2 hours, 15 min., chlorine content=38.5%, Vicat temperature=31° C., bulk weight=294 g./l.

EXAMPLE 13

Starting materials: G.
- High-pressure polyethylene powder ($d$=0.915 g./cm.$^3$), melting index=5 _____ 350
- Desalted water _____ 2800
- DMSO _____ 24

The reaction was conducted according to the procedure described in Example 12. Reaction temperature=60° C., reaction time=1 hour, chlorine content=39.1%, Vicat temperature=38° C., bulk weight=532 g./l.

EXAMPLE 14

Starting materials: G.
- Low-pressure polyethylene powder ($d$=0.950 g./cm.$^3$), melting index=1.8 _____ 350
- Desalted water _____ 2800
- DMSO _____ 28

The chlorination was carried out analogously to Example 12. Reaction temperature=60° C., reaction time=1 hour, chlorine content=46.6%, Vicat temperature=55° C., bulkweight=368 [g./l.].

The products which were obtained according to the above examples were made into finished products with the addition of 3 wt. percent barium-cadmium stabilizer, 2% montanic ester wax and 0.2% calcium stearate. The oven test at 185° C. showed the following thermostabilities:

| Example: | Thermostability (min.) |
|---|---|
| 1 | 120 |
| 2 | 100 |
| 3 | 100 |
| 4 | 80 |
| 5 | 100 |
| 6 | 80 |

We claim:

1. Process for chlorinating homopolymers or copolymers of at least one member selected from the group consisting of vinyl chloride and ethylene which comprises contacting said polymer or copolymer with chlorine in aqueous suspension containing 0.03 to 20% by weight referred to said polymer or copolymer of dimethylsulfoxide as swelling agent, at a temperature of from 0 to 100° C. and under irradiation by visible light containing short-wave length components or ultraviolet light.

2. Process according to claim 1 wherein said dimethylsulfoxide is present in an amount of 0.07 to 3% by weight referred to said polymer or copolymer.

3. Process according to claim 1 wherein said contacting is effected in the additional presence of a chlorinated hydrocarbon.

4. Process according to claim 3 wherein said chlorinated hydrocarbon is present in an amount of from 0.1 to 50 wt. percent referred to the dimethylsulfoxide.

5. Process according to claim 1 wherein said contacting is effected in the additional presence of at least one peroxy compound, said peroxy compound being present in an amount of from 0.01 to 3 wt. percent referred to said polymer or copolymer.

6. Process according to claim 1 wherein said contacting is effected in the additional presence of at least one peroxy compound, said peroxy compound being present in an amount of from 0.01 to 0.5 wt. percent referred to said polymer or copolymer.

7. Process according to claim 1 wherein a portion of said dimethylsulfoxide is introduced during said contacting.

8. Process according to claim 1 wherein said polymer is polyvinylchloride.

9. Process according to claim 1 wherein said polymer is a mixture of polyvinylchloride and polyethylene.

10. Process according to claim 1 wherein said polymer is polyethylene.

References Cited

UNITED STATES PATENTS

| | | | |
|---|---|---|---|
| 3,334,077 | 8/1967 | Gateff | 260—92.8 |
| 3,328,371 | 6/1967 | Beer | 260—92.8 |
| 3,287,336 | 11/1966 | Taylor | 260—92.8 |
| 2,617,777 | 11/1952 | Heisenberg et al. | 260—30.8 |
| 1,982,765 | 12/1934 | Schönburg | 260—92.8 |

MURRAY TILLMAN, Primary Examiner

R. B. TURER, Assistant Examiner

U.S. Cl. X.R.

260—30.8, 92.8, 94.9, 878, 897

UNITED STATES PATENT OFFICE
CERTIFICATE OF CORRECTION

Patent No. 3,585,117      Dated June 15, 1971

Inventor(s) WILLIAM GRESSER and GUNTHER MEYER

It is certified that error appears in the above-identified patent and that said Letters Patent are hereby corrected as shown below:

Column 2, line 25, "through" should be --though--; column 3, line 4, cancel the comma between "methyl" and "chloride"; column 4, line 47, "Purifiication" should be --Purification--; column 5, line 43, "115° C." should be --114° C.--; column 5, line 44, "500 g./1." should be --455 g./1.--; column 6, line 12, "115° C." should be --113° C.--; same line, "500 g./1." should be --473 g./1.--; column 6, lines 29-30, "(d=0.915 g./cm.$^3$)" should be --(d=0.924 g./cm.$^3$)--

Signed and sealed this 16th day of November 1971.

(SEAL)
Attest:

EDWARD M. FLETCHER, JR.
Attesting Officer

ROBERT GOTTSCHALK
Acting Commissioner of Patents